United States Patent
Khanna

(10) Patent No.: US 10,754,904 B2
(45) Date of Patent: Aug. 25, 2020

(54) ACCURACY DETERMINATION FOR MEDIA

(71) Applicant: Microsoft Technology Licensing, LLC, Redmond, WA (US)

(72) Inventor: Varun Khanna, Pune (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 313 days.

(21) Appl. No.: 15/871,724

(22) Filed: Jan. 15, 2018

(65) Prior Publication Data

US 2019/0220544 A1 Jul. 18, 2019

(51) Int. Cl.
*G06F 7/00* (2006.01)
*G06F 16/9535* (2019.01)
*G06F 16/33* (2019.01)
*G06F 16/955* (2019.01)

(52) U.S. Cl.
CPC ...... *G06F 16/9535* (2019.01); *G06F 16/3344* (2019.01); *G06F 16/9558* (2019.01)

(58) Field of Classification Search
CPC ............. G06F 16/9535; G06F 16/9558; G06F 16/3344
USPC .................................. 707/600–899
See application file for complete search history.

(56) References Cited

U.S. PATENT DOCUMENTS

| | | | |
|---|---|---|---|
| 7,434,155 B2 | 10/2008 | Lee | |
| 8,849,827 B2 | 9/2014 | Moganti et al. | |
| 9,407,892 B2 | 8/2016 | Mo et al. | |
| 9,436,684 B2 | 9/2016 | Donis et al. | |
| 9,602,850 B2 | 3/2017 | Qian et al. | |
| 9,703,463 B2 | 7/2017 | Avedissian et al. | |
| 2005/0210501 A1 | 9/2005 | Zigmond et al. | |
| 2006/0230035 A1* | 10/2006 | Bailey | G06F 16/24578 |
| 2007/0005592 A1 | 1/2007 | Kender et al. | |
| 2007/0174324 A1 | 7/2007 | Palapudi et al. | |
| 2012/0221583 A1 | 8/2012 | Kulack et al. | |
| 2012/0260159 A1 | 10/2012 | Lazier et al. | |
| 2013/0198196 A1 | 8/2013 | Myslinski | |
| 2014/0130099 A1 | 5/2014 | Kunisetty | |
| 2014/0215305 A1 | 7/2014 | Vanderwende et al. | |
| 2015/0245111 A1 | 8/2015 | Weinberger et al. | |
| 2016/0078149 A1 | 3/2016 | Gaucher et al. | |

OTHER PUBLICATIONS

"International Search Report and Written Opinion Issued in PCT Application No. PCT/US18/065577", dated Mar. 21, 2019, 12 Pages.

(Continued)

*Primary Examiner* — Isaac M Woo
(74) *Attorney, Agent, or Firm* — Schwegman Lundberg & Woessner, P.A.

(57) ABSTRACT

Methods and systems for determining accuracy for media are disclosed. In one aspect, a method includes identifying a data segment of an electronic data object that is encoding one or more assertions including a first assertion, compiling a search query based on the one or more assertions, generating search results by conducting a first information search using the search query, identifying a most recent time associated with a search result of the search results that relates to the first assertion, generating an accuracy weighting for the first assertion based on search result, and annotating the first assertion based on the accuracy weighting to indicate the assertion's accuracy.

20 Claims, 11 Drawing Sheets

(56) References Cited

OTHER PUBLICATIONS

Zhang, et al., "Effective Annotation and Search for Video Blogs with Integration of Context and Content Analysis-", In Journal of IEEE Transactions on Multimedia, vol. 11, No. 2, Feb. 2009, pp. 272-285.

* cited by examiner

ACCURACY DETERMINATION FOR MEDIA

BACKGROUND

The creation of electronic content within an enterprise is ongoing. Over time, organizations may amass a large amount of electronic content, as electronic content is continuously created. This electronic content represents a valuable asset to many organizations, as it frequently documents technical, business and other content important for operation of the enterprise. For example, modern conferencing systems provide for the easy recordation of meetings, resulting in more employees using these features. As a result, a vast number of recorded meetings may be saved in an organization's electronic library. Unfortunately, these recordings can be somewhat opaque, limiting an organization's ability to index and search these meetings for content. For example, while a date, time, length, and perhaps subject of the meeting may be readily available in meta data form, frequently these recorded meeting include few additional details as to the true content of the meeting. This may reduce an organization's ability to leverage content within these recordings. Similarly, other forms of electronic content, such as documents from a word processing application, spreadsheets, presentations, and diagrams may be similarly opaque. Thus, organizations are challenged to fully leverage the value of their content libraries. Therefore, improved methods of characterizing, organizing, and leveraging electronic content libraries are needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
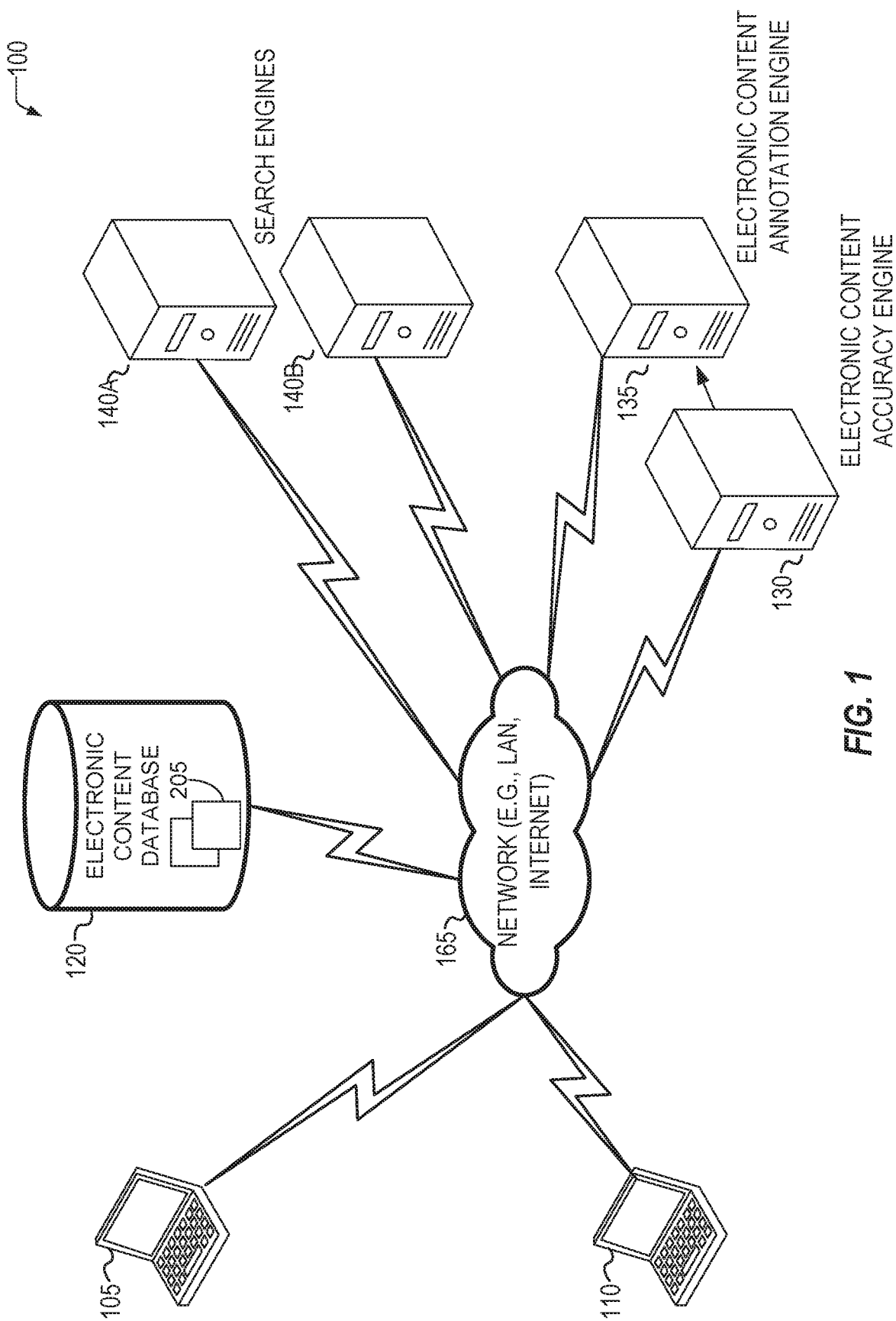
FIG. 1 shows an example system for media accuracy determination.

As discussed above, organizations may amass a relatively large library of electronic content or media. Making use of this large library has several challenges, including understanding which of the electronic content or media is still relevant as it ages. Users may in some cases improperly dismiss electronic content beyond a certain age, while some of that content may still be very relevant. Some users may rely on content created more recently. However, in some cases, that content, especially if referencing a rapidly evolving technical area, may already be obsolete, despite its relative youth. Thus, organizations with significant libraries of technical content are confronted with the technical problem of how to identify the relevancy of each electronic content or media within the library. Moreover, some electronic content may include a portion that includes relevant content and another portion that includes content that is out of date, obsolete, or otherwise not of particular value to the organization. Because of uncertainty with regard to relevancy or accuracy of content included in the electronic library, this content may not be fully leveraged by the organization. Thus, their technical problem prevents appropriate use of assets embodied by their electronic content library. Furthermore, these electronic content libraries may consume substantial storage resources. This may impose substantial cost on an organization, not only in terms of the cost of the storage hardware necessary to physically store the library, but also in terms of data center space, utilities, and personnel costs associated with maintaining this electronic content library.

The disclosed embodiments provide a technical solution to the technical problem described above. These solutions provide organizations with greater insight into the relevance and accuracy of electronic content as it ages. In some aspects, the disclosed embodiments may search electronic content or electronic data objects, such as a document, presentation, or drawing, for assertions made by the electronic data objects. The disclosed embodiments may then search a variety of information sources, including Internet search engines, domain specific databases, and other information sources to verify or invalidate the assertions. From this information, an indication of an accuracy of the electronic data objects may be determined.

This indication of accuracy may be used for a variety of purposes to assist organizations in solving the technical problem described above. The accuracy indication may provide organizations with greater insight into the accuracy of electronic content within their content libraries and empower organizations to make better decisions with regard to how to manage their content libraries. For example, in some cases, organizations may choose to delete newer content that is less accurate, while preserving older content that is still relevant. This contrasts with most solutions which typically use the age of the electronic content to determine its relevance. Additionally, by better understanding the accuracy of electronic content within an electronic content library, an organization may more fully leverage the latent value present in the electronic content library. For example, access to more accurate or relevant content may be preferred relative to less accurate content via a variety of techniques. In some aspects user interfaces may be presented that allow a user to sort a list of electronic data object based on an accuracy score established for each electronic data object in the list. This may allow the user to quickly identify that content which they should considerer and other content that may not be worth their time. Archival strategies may also, in some cases, be based on accuracy indications established by the disclosed implementations. For example, portions of a content library with accuracies below a predetermined threshold may be archived, freeing up storage space for more relevant content, while preserving an organization's ability to refer back to the archived content if every needed.

In some aspects, the disclosed embodiments may be applied to interactive data, such as group messaging conversations, chat sessions, email conversations, or the like. To identify the assertions from the electronic data objects, some embodiments may perform optical character recognition on images, speech to text conversion on audio data, and the like to obtain text versions of the electronic content. The text extracted from the electronic content may then be parsed to identify assertions. Some of the assertions may assert a fact. For example, an assertion may assert that a most recent version of certain software is a particular version, or that a release date for a particular product is a certain date.

The disclosed embodiments may then search a variety of information resources for information corroborating the assertion by the electronic data object. In some aspects, the information resources may be prioritized, such that information retrieved from a first source is ranked more highly than information retrieved from a second source. In some aspects, the search may be augmented based on meta data associated with the electronic content.

If the assertion is verified via information generated within a predetermined time period of a present date, then the disclosed embodiments may conclude that the assertion is valid. If no relatively recent corroboration of the assertion is found, an additional search may be performed. If information returned by this search identifies a new assertion that is incompatible with the original assertion, then the original assertion may be determined to be obsolete.

After the assertions identified in the electronic content are individually corroborated (or not), an accuracy assessment or weighting of the electronic content or electronic data object is made based on the continuing accuracy or lack thereof of the assertions included in the electronic content. This accuracy assessment may be used in a variety of ways. For example, the accuracy assessment may be included as meta data with the electronic content. Thus, it may be used, for example, as search criteria for electronic content in some aspects.

In some implementations, individual assertions may be annotated in the electronic content based on their accuracy assessment. For example, in some aspects, if a particular assertion in a presentation is determined to be obsolete, an annotation indicating the assertions lack of accuracy may be added to the presentation at a time corresponding to the presentation of the assertion. This annotation could be in text or audio form in some aspects.

Some aspects may automatically update assertions that are deemed to be inaccurate. For example, in some aspects, in response to an assertion's accuracy score, a new assertion may be generated. The new assertion may be based on the original assertion, but updated to include new data obtained from the search.

Turning now to FIG. 1, an example system 100 for electronic content accuracy determination is presented. The system 100 includes an electronic content database 120. The electronic content database may include one or more individual pieces of electronic content 205. The electronic content may include any data defining one or more assertions. For example, the electronic content may be documents, such as word processing documents, traditional web-based document formats such as html, xml, or other structured markup formats, presentations, such as those produced by Microsoft PowerPoint®, drawings, such as those produced by Microsoft Visio®, spreadsheets, such as those products by Microsoft Excel®, video files, such as those encoded in a format developed by the Motion Pictures Experts Group (MPEG), audio files, or any other data format. The electronic content database 120 may be accessible by one or more user devices, such as user devices 105 and/or 110 illustrated in FIG. 1. In some aspects, the electronic content stored within the electronic content database 120 may be accessed by the client devices via one or more document management applications, such as Microsoft SharePoint®. In some other aspects, the electronic content database 120 may be a Microsoft Windows® file system, and thus the electronic content on the electronic content database may be accessed via an operating system file system, such as Microsoft Windows®.

The system 100 also includes an electronic content accuracy engine 130. The electronic content accuracy engine 130 may read electronic content 205 in the electronic content database 120 and analyze the electronic content 205 to determine the electronic content's accuracy. For example, as discussed above, assertions within the electronic content may be identified. While these assertions may have been true at the time the electronic content 205 was created, over time, these assertions may become false. As one example, an assertion that the total population of the earth is four (4) billion people may have been true in 1975. However, in 2016, this assertion is no longer true.

As discussed in more detail below, based on analysis of the electronic content 205, the electronic content accuracy engine 130 may determine an accuracy score for electronic content 205 included in the electronic content database 120. In some aspects, the accuracy engine 130 may pass information to an electronic content annotation engine 135. The electronic content annotation engine 135 may modify the electronic content 205 based on determinations made by the electronic content accuracy engine 130. For example, assertions made by the electronic content 205 that are identified by the electronic content accuracy engine 130 incorrect or out of date, may be annotated as inaccurate or out of date by the electronic content annotation engine 135, such that future views of the electronic content 205 may benefit from those determinations.

The system 100 also includes one or more search engines 140, shown in FIG. 1 as two search engines 140A-B. The search engines may be utilized by the electronic content accuracy engine 130 to search for information relating to assertions made by the electronic content 205 and/or facts asserted by the electronic content 205. For example, information identified by the search engines 140A-B may be used to invalidate certain facts asserted by the electronic content 205 in some aspects.

While the system 100 of FIG. 1 is illustrated as being comprised of physically separate devices, such as the user devices 105 and 110, along with the electronic content accuracy engine 130, electronic content annotation engine 135, and search engines 140A-B, some embodiments are contemplated that combine one or more structures and/or functions illustrated in FIG. 1 and/or described below onto fewer physical devices than those illustrated in FIG. 1. In some aspects, the one or more structures and/or functions may be combined into a single physical device. For example, in some aspects, a client device, such as any one of the devices 105 or 110 may include the electronic content accuracy engine 130 and/or electronic content annotation engine 135 on the device 105 or 110 itself. In some aspects, the electronic content database 120 may also be included on the user device 105 or 110. For example, in some aspects, the electronic content database 120 may consist of a portion of a file system of the user device 105 or 110.

Figure 2:
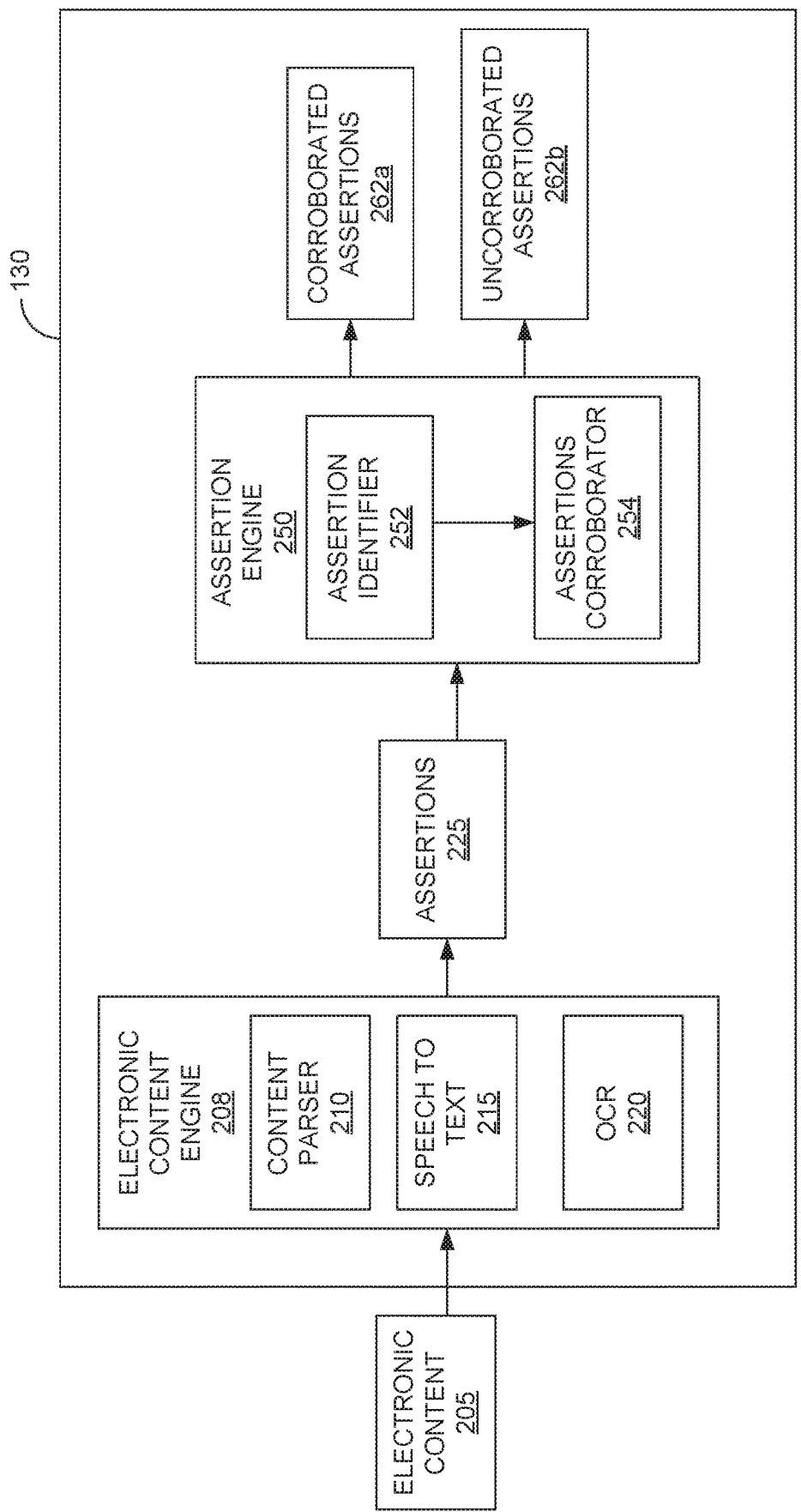
FIG. 2 is an example data flow that may be implemented in at least some of the disclosed embodiments

FIG. 2 is an example data flow that may be implemented in at least some of the disclosed embodiments. Starting from the left, FIG. 2 shows electronic content 205. The electronic content 205 may include any of a document, presentation, drawing, spreadsheet, video, snapshot image, or any electronic data that stores information. The electronic content 205 may be a database, a file, or any data in any structured or unstructured form. The electronic content 205 is read by an electronic content engine 208. The electronic content engine may include an electronic content parser 210, speech to text engine 215, and an optical character recognition algorithm 220. The electronic content parser may read data included in the electronic content 205, and identify first text data. The electronic content parser 210 may also identify if audio information in the electronic content 205 is present. The electronic content parser 210 may pass the audio information to the speech to text engine 215, which may generate second text information from the audio information. The electronic content parser may also identify image information within the electronic content 205 if present. The electronic content parser may pass the image information to the optical character recognition algorithm 220, which may generate third text data based on the electronic content 205. At least the combined first, second, and third text data may be parsed to identify assertions 225 within the first, second, and third text data. For video content, the audio may be processed by the speech to text engine 215 and the images may be processed by the optical character recognition algorithm 220.

The assertions 225 are read by an assertion engine 250. The assertion engine 250 may include an assertion identifier 252 and an assertion corroborator 254. The assertion identifier 252 may read the assertions 225 to identify one or more assertions within the assertions 225. The identified assertions are provided by the assertion identifier 252 to the assertion corroborator 254. The assertion corroborator 254 may search one or more information resources to find corroborating information for the relevance of the assertions identified by the assertion identifier 252. Some assertions may be corroborated while others may not. As a result, the assertion engine generates a list of corroborated assertions 262a and a list of uncorroborated assertions 262b.

Figure 3:
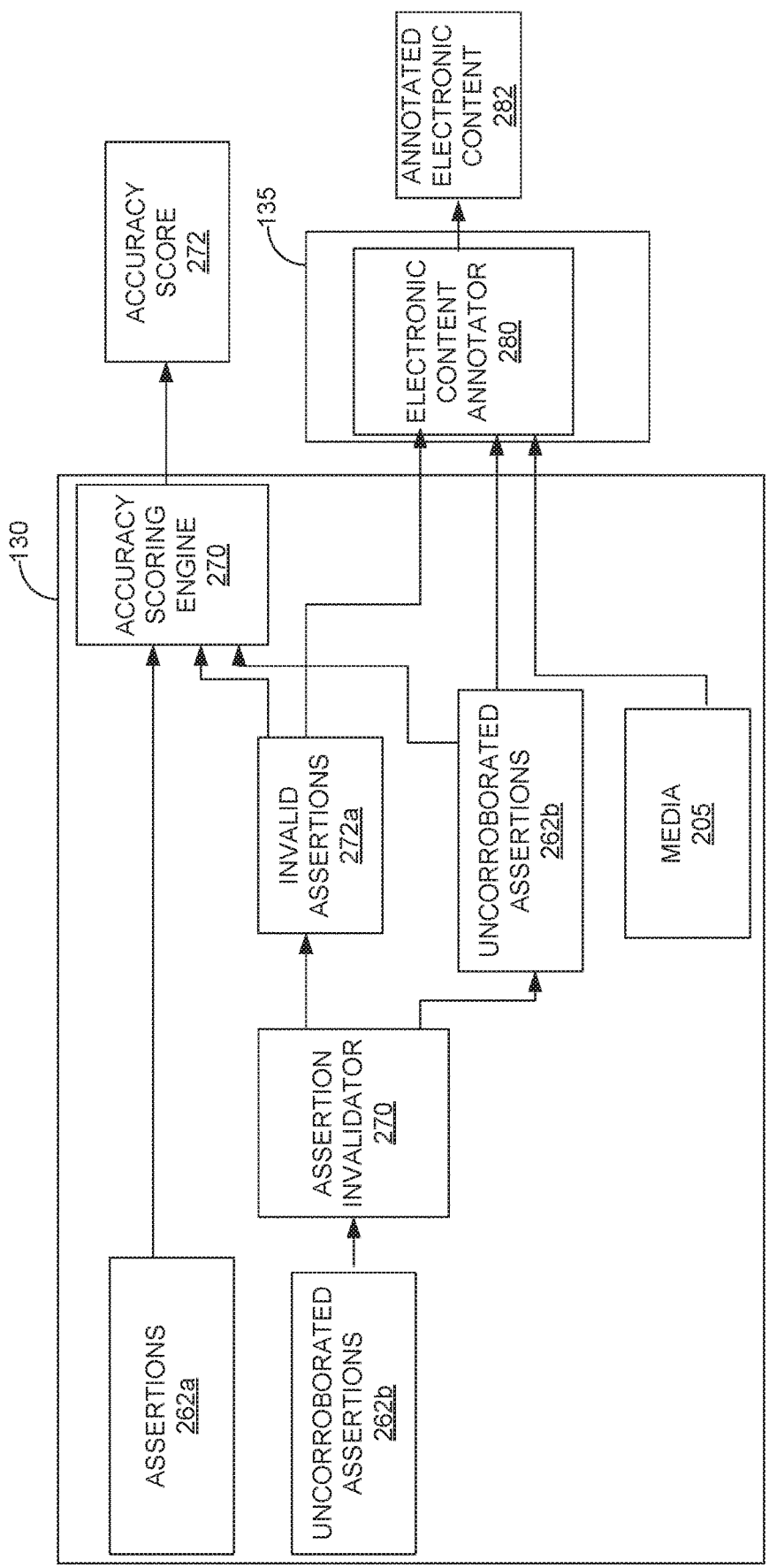
FIG. 3 is a continuation of the data flow of FIG. 2.

FIG. 3 is a continuation of the data flow of FIG. 2. The uncorroborated assertions 262b of FIG. 2 are provided to an assertion invalidator 270. The assertion invalidator seeks to disprove the uncorroborated assertions 262 developed by the processes illustrated in FIG. 2. Above. The assertion invalidator 270 thus generates a list of invalid assertions 272a, those assertions of the uncorroborated assertions 262b that the assertion invalidator was able to disprove, and uncorroborated assertions 272b, which represent a portion of the uncorroborated assertions 262b that could not be disproven or invalidated by the assertion invalidator 270.

An accuracy scoring engine 270 receives the assertions 262a, invalid assertions 272a, and uncorroborated assertions 262b, and generates an accuracy score 272 for the electronic content 205. A electronic content annotator 280 receives the electronic content 205, invalid assertions 272a and uncorroborated assertions 262b and generates annotated electronic content 282.

Figure 4:
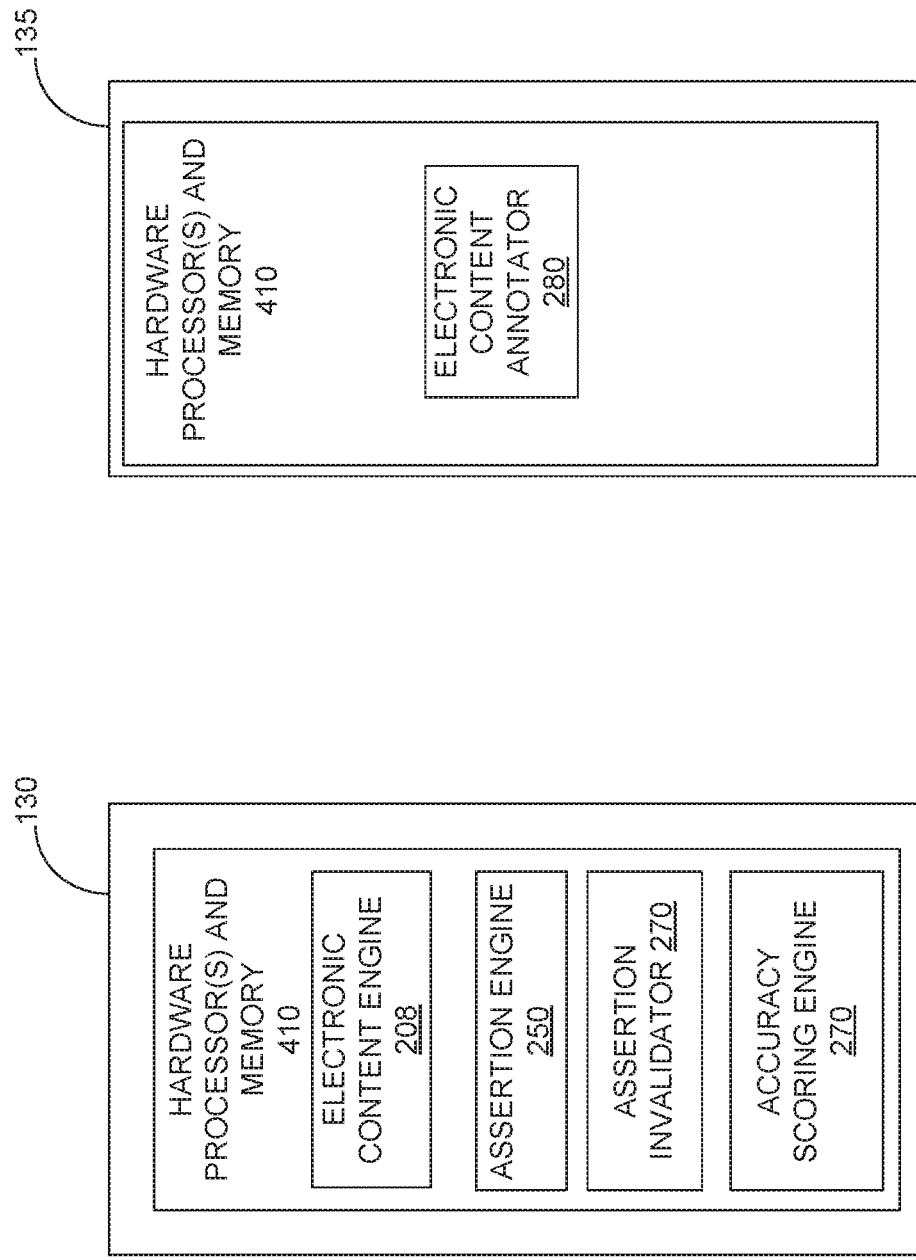
FIG. 4 is a high-level view of the media accuracy engine 130 and media annotation engine, discussed above with respect to FIG. 1.

FIG. 4 is a high level view of the electronic content accuracy engine 130 and electronic content annotation engine 135, discussed above with respect to FIG. 1. Components of the electronic content accuracy engine 130 and electronic content annotation engine 135 were discussed above with respect to FIGS. 2 and 3. For example, in one aspects, the electronic content accuracy engine 130 may include an electronic content engine 208, assertion engine 250, assertion invalidator 270, and accuracy scoring engine 270. The electronic content annotation engine 135 may include at least the electronic content annotator 280 in some aspects.

To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the electronic content accuracy engine 130 and the electronic content annotation engine 135 to facilitate additional functionality that is not specifically described herein.

The above referenced functional components of the electronic content accuracy engine 130 and the electronic content annotation engine 135 are configured to communicate with each other (e.g., via a bus, shared memory, a switch, or APIs). Collectively, these components facilitate analysis of electronic content to determine a level of accuracy of the electronic content, and in some aspects, annotation of the electronic content to indicate accuracy of assertions included within the electronic content.

It is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the electronic content accuracy engine 130 and/or the electronic content annotation engine 135 may physically include an arrangement of one or more hardware processors 410 (e.g., a subset of or among one or more processors of a machine) and hardware memory configured to perform the operations described herein for that component. As another example, any component of the video electronic content accuracy engine 130 and/or electronic content annotation engine 135 may include software, hardware, or both, that configure an arrangement of the one or more processors and memory 410 to perform the operations described herein for that component. Accordingly, different components of the electronic content accuracy engine 130 and/or electronic content annotation engine 135 may include and configure different arrangements of such processors 410 or a single arrangement of such processors 410 at different points in time. In some aspects, the processors and memory 410 may be equivalent to the processor 802 and memory 804 discussed below with respect to FIG. 8.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-9.

Figure 5:
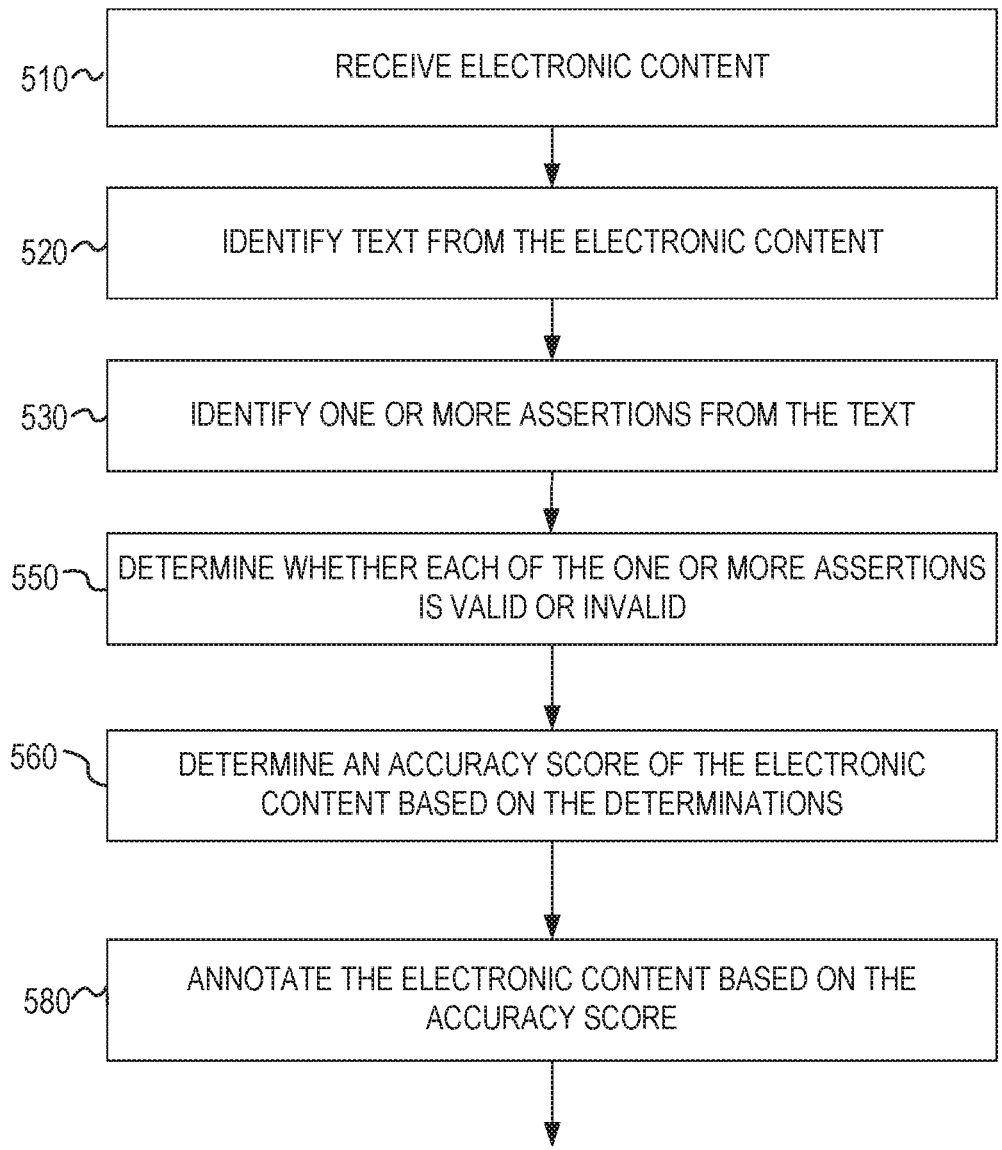
FIG. 5 is a flowchart of an example method for determining an accuracy score for media.

FIG. 5 is a flowchart of an example method for determining an accuracy score for electronic content. In some aspects, one or more of the functions discussed below with respect to process 500 and FIG. 5 may be performed by the processor(s) 410, discussed above with respect to FIG. 4.

For example, instructions stored in one or more of the electronic content engine 208, assertion engine 250, assertion invalidator 270, and accuracy scoring engine 270 may configure one or more hardware processors 410 to perform one or more of the functions discussed below.

In block 510, electronic content is received. The electronic content may be, for example, electronic content 205, discussed above. The electronic content may include meta data.

In block 520, text is identified from the electronic content. For example, as discussed above, in some aspects, the electronic content parser 210 of the electronic content engine 208 may identify one or more of first text data, audio data, or image data in the electronic content received in block 510. In some aspects, the audio data may be run through a speech to text application to generate second text data from the audio data. In some aspects, an optical character recognition process may be applied to the image data to generate third text data. In various aspects, one or more of the first text data, second text data, and third text data may be identified by block 520. In some aspects, at least a portion of the first text data may be obtained from meta data included in the electronic content. For example, as discussed above, the electronic content may include content data and meta data.

In block 530, one or more assertions are identified from the text. For example, in various aspects, block 530 may utilize one or more natural language parsers (NLP), such as the Stanford parser, spaCy, or Google's Cloud Natural Language API. In some aspects, machine learning may be used to identify assertions from the text. For example, as discussed further below with respect to FIG. 10, in some aspects, a classifier may be trained using training data. The training data may include training text. The training data may also include annotation data. The annotation data may identify assertions within the training text. Using the training data, a model may be built to train the classifier. Once the classifier is trained, other text may be provided to the classifier, and the classifier may identify text forming a assertion and other text that it not included in a assertion. In some examples, assertions may be determined based upon one or more grammar rules. In some aspects, block 530 may use the trained classifier to identify assertions in the text.

In block 550, a determination is made as to whether each of the identified assertions is valid or invalid. One embodiment of block 550 is explained in more detail below with respect to FIG. 6.

In block 560, an accuracy score of the electronic content is determined based on the invalidity and/or validity of the assertions, as determined in block 550. For example, in some aspects, the accuracy score may represent a percentage of assertions within the electronic content that are accurate. Other implementations are also contemplated. For example, some assertions may be weighted more heavily than other assertions in the accuracy determination. For example, if a particular assertion relates to a portion of the electronic content that represents a relatively larger percentage of the electronic content, the particular assertion may receive more weight in the accuracy determination than a second assertion that is associated with a second, smaller portion of the electronic content. In some aspects, the portions of the electronic content may be identified by portion delineators in the electronic content. For example, if the electronic content is a document, the delineators may be chapter headings or section breaks. If the electronic content is a presentation, delineators may be title slides or changes to a slide master within the presentation in some aspects.

In some aspects, the determined accuracy score is written to an output device. In some aspects, the output device may be a stable storage device, such as a hard disk. In some aspects, the accuracy score may be written to meta data associated with the electronic content itself. For example, the electronic content and the meta data may be stored within a single file. In some aspects, the determined accuracy score may be written to a network. In some aspects, the output device may be a network card. For example, the accuracy score may be written to a file or a database that is accessible over a network.

In some aspects, the accuracy score may be used by one or more applications to provide additional information to users of the electronic content. For example, in some aspects, a user interface may provide for sorting of electronic content files based on accuracy scores included in the meta data of the electronic content. In some aspects, various visual representations of electronic content accuracy may be implemented. For example, in some aspects a first icon may be used to represent electronic content with accuracy meeting a first criterion, while a second icon may be used to represent electronic content with an accuracy meeting a second criterion. For example, a file explorer application may display the accuracy rating.

In block 580, the electronic content may be annotated based on the accuracy score. For example, in some aspects, the annotation may take the form of one or more of at least meta data, audio data, or image data. For example, if a particular portion of the electronic content is determined to have a low accuracy (for example, an accuracy meeting a criteria), an image annotation indicating such may be inserted into the electronic content. Alternatively, in some aspects, the image annotation may insert more accurate information into the electronic content. The inserted annotation may be inserted so as to obscure the obsolete or inaccurate information. For example, obsolete or inaccurate information may be whited out or blacked out with a first annotation. A second annotation including more accurate information may then be inserted on top of the whited out or blacked out area for example. Alternatively, if the inaccurate information in the electronic content is in audio form, an audio annotation may be inserted at a position within a limited proximity of the inaccurate audio information. For example, the inaccurate information may be "beeped" out with a first annotation, and a second annotation of accurate audio information may be inserted.

In some aspects, annotating the electronic content may include moving portions of the electronic content to different locations within the electronic content. For example, electronic content having an accuracy score below a threshold may be moved to an "end" or "back" of electronic content. The "end" or "back" may be a last portion of electronic content that is played during a "play" operation. For example, the last slide or slides of a presentation may be considered an "end" or "back" of the presentation. The new position of the obsolete portion(s) of the electronic content may be in later in a sequence of content when the electronic content is played.

Figure 6:
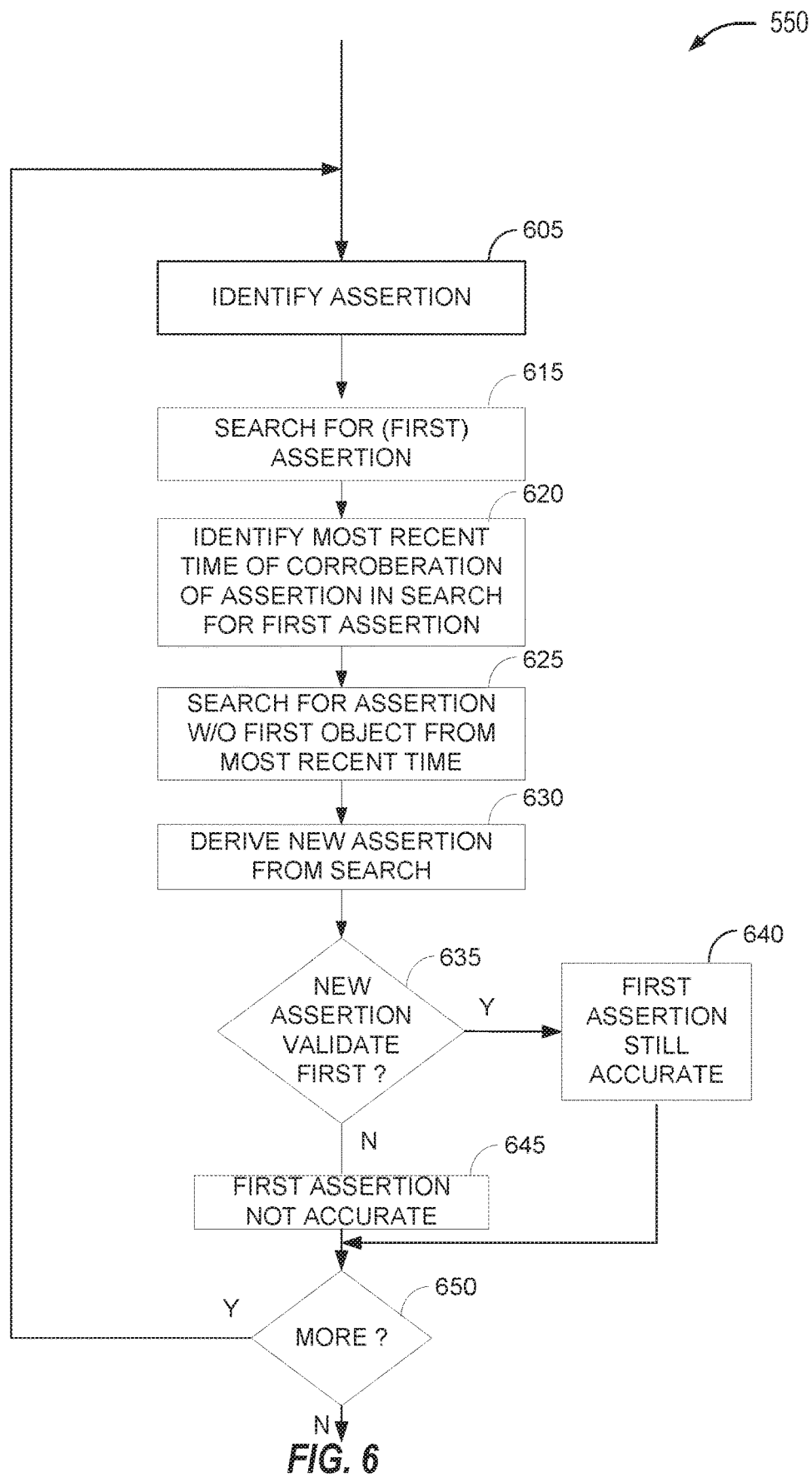
FIG. 6 is an example flowchart of a method for determining whether a statement is valid or invalid.

FIG. 6 is an example flowchart of a method for determining whether an assertion is valid or invalid. In some aspects, one or more of the functions discussed below with respect to FIG. 6 and process 550 may be performed by the processors 410 in some aspects, discussed above with respect to FIG. 4. For example, instructions stored in one or more of the electronic content engine 208, assertion engine 250, assertion invalidator 270, and accuracy scoring engine 270 may configure one or more hardware processors 410 to perform one or more of the functions of the example process 550 discussed below.

In block 605, an assertion is identified. For example, the assertion may be identified from the one or more assertions identified in block 530 of process 500, discussed above. In some aspects, block 605 may receive text data derived from electronic content (such as a media file). Block 605 may then identify one or more sentences from the text. In some aspects, block 605 may make use of a natural language tool kit (NLTK) to segment the text into sentences. Each sentence may be further divided into words by a tokenizer. Each sentence identified in block 605 may be considered an assertion in some aspects. In some aspects, sentences may be structured as tuples, with components including a subject, an object, and a relation between the subject and object. In some aspects, the tuples may be generated via an open information exchange (OIE) library, such as the OIE library available from Stanford University.

In some aspects, named entity detection may be used to label portions of each assertion. The named entity detection may rely on a database that maps entities to categories and/or well-known names. Relation detection may then be performed to identify relationships between entities within an assertion. The result of this process may be a collection of tuples that include structured data with named entities. The entities may be joined by a relation. Each of the tuples generated in block 605 may then be treated as data asserting a fact. The tuples may then each be individually verifiable.

Block 615 searches for corroboration of the assertion. The search may rely on one or more data sources for information. In some aspects, the data sources may be prioritized based on a topic. For example, the assertion may be classified as one of a plurality of topics. Information sources may be associated with one or more topics. When selecting an information source, block 615 may select an information source associated with the topic of the assertion.

Block 620 determines a most recent time of corroboration of the assertion in the search of block 615. For example, block 615 may identify, from its search, several assertions. In some aspects both the assertion and the search results may be analyzed by an open information exchange (OIE) library to generate tuples including a subject, object, and relation. The search results may then be filtered to those including an equivalent subject and an equivalent relation as the original assertion. From this filtered set of tuples, tuples having the same object corroborate the assertion while tuples having a different object invalidate the assertion.

The examples of corroboration identified in block 615 may each have an associated date. For example, an internet search for corroboration of the assertion may identify a document having a particular availability time on the Internet.

Block 625 searches for the assertion without the asserted object of the tuple. For example, as discussed above, the assertion may be represented by a tuple including a subject, object, and relation between the subject and object. For example, in the assertion "the earth's population is 4 billion people," the assertion may be separated into three parts, (earth's population, is equal to, 4 billion). The new assertion derived in block 630 may include only the subject and relation portion of the assertion and not include the object portion of the assertion. As another example, if the assertion of block 615 asserts "Microsoft Windows® version 8," block 630 may search for an assertion of "Microsoft Windows® version." Block 625 also searches for results that postdate the corroborating results found in block 620.

Figure 7:
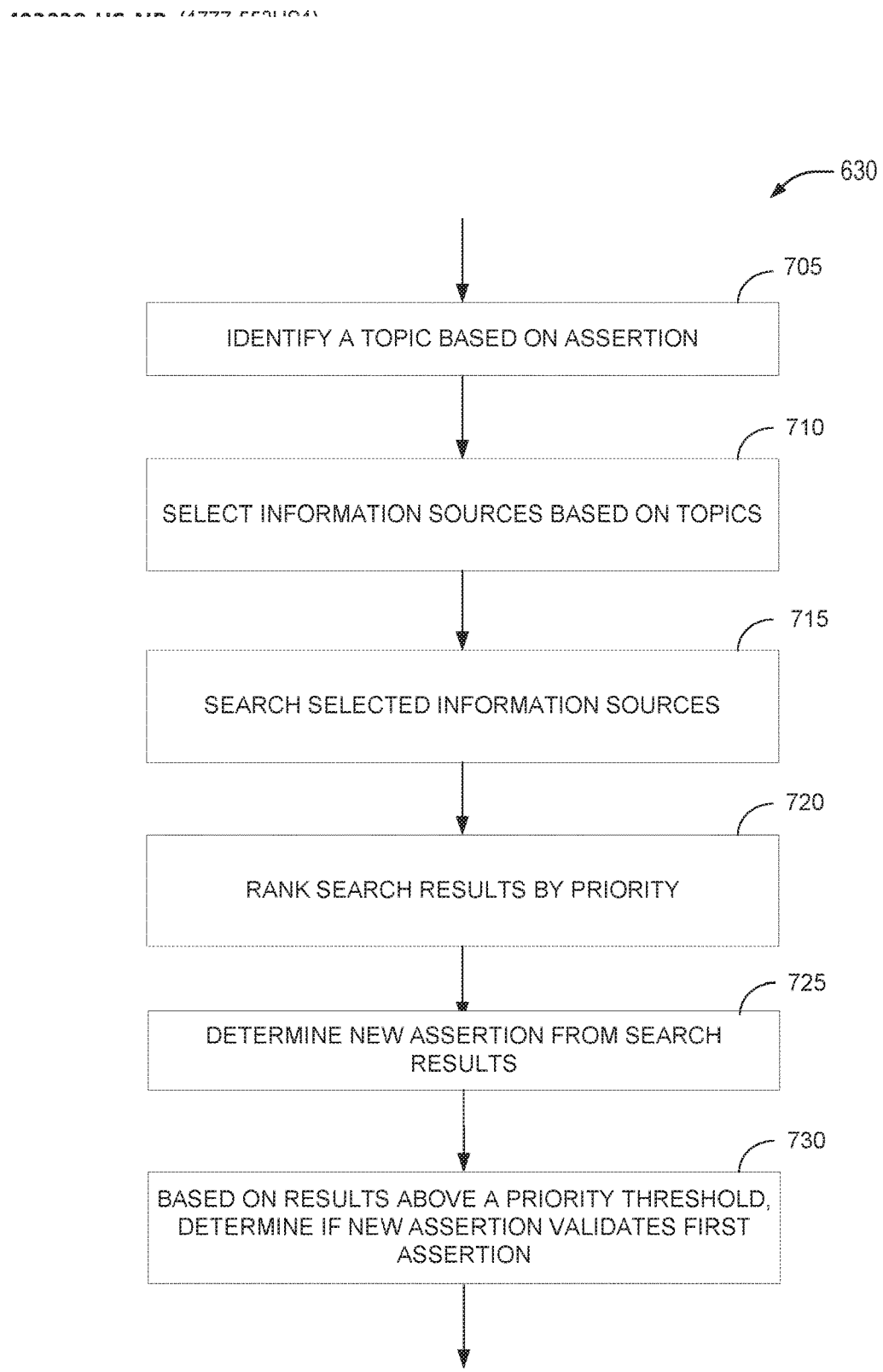
FIG. 7 is an example flowchart of a method for determining whether a new assertion validates another assertion.

In block 630, a new assertion is derived from the search results identified in block 625. As one example, the search results may include multiple versions of the assertion relating to "the earth's population." For example, results may indicate the earth's population is 6, 7, 8, or 9 billion people. These results may be sorted or ranked using a variety of techniques, which may vary by embodiment. FIG. 7 describes one example embodiment in more detail. For example, some embodiments may rank or sort the results by a date associated with the individual results. In these embodiments, the most recent results may take priority over older results. Thus, in the example above, if the 9 billion value is most recent, that result may be selected as the "new assertion."

Decision block 635 determines whether the new assertion (e.g. "the earth's population is 9 people") validates the first assertion. If the new assertion validates the first assertion, process 550 moves to block 640, and the first assertion is marked as accurate. In some aspects, block 640 may increment a count of accurate assertions. The count may be used in determining an accuracy score of electronic content including the first assertion, for example, as discussed above with respect to block 570. After block 640, process 550 moves to decision block 650, discussed below.

If the first assertion is not validated by the new assertion, process 550 moves to block 645, which marks the first assertion as not accurate. Block 645 may also increment a count of inaccurate assertions for particular electronic content. This second count may also be used in determining the accuracy score of electronic content including the first assertion, for example, as discussed above with respect to block 570. After block 645 completes, process 550 moves to block 650, which determines whether there are additional assertions to process. If there are, processing may return to block 605, where an additional assertion is identified and process 550 repeats as described above. If there are no more assertions to process, process 550 moves from decision block 650, to additional processing. In some aspects, blocks 560 and/or 570 of process 500, discussed above with respect to FIG. 5, may follow completion of block 650.

FIG. 7 is an example flowchart of a method for determining whether a new assertion validates another assertion. In some aspects, one or more of the functions discussed below with respect to FIG. 7 and process 630 may be performed by the processors 410 in some aspects, discussed above with respect to FIG. 4. For example, instructions stored in one or more of the electronic content engine 208, assertion engine 250, assertion invalidator 270, and accuracy scoring engine 270 may configure one or more hardware processors 410 to perform one or more of the functions of the example process 550 discussed below. In some aspects, the one or more hardware processors 410 of FIG. 4 may be equivalent to the processor 802, discussed below with respect to FIG. 8.

In block 705, a topic or category is identified based on an assertion. In some aspects, meta data included in the electronic content 205 may identify topics or categories. In some aspects, non-meta data content from the electronic content 205, such as one or more of text, audio information and/or image or video information may be used to derive a topic or category. For example, in some aspects, block 705 may include classifying assertions included in electronic content 205 into a plurality of groups or topics, based on a commonality between assertions included in a particular group. For example, in some aspects, keywords within the assertions may be used to classify the assertions into groups. For example, assertions sharing a common keyword may be included in a single group. In some aspects, a relationship between multiple words found in a plurality of assertions may be used to classify the assertions into a single group or different groups. For example, assertions including the words "computer," "processor," or "software," may be classified into an "information technology" topic or category, while assertion includes the words "health," "patient," or "outcomes" may be classified into a "health" topic or category. In some aspects, a latent Dirichlet allocation (LDA) may be utilized to classify assertions.

In block 710, information sources are selected based on topics or categories. For example, the system 100 may maintain a list of information sources. For example, search engines 140a and 140b may be examples of information sources included in the list. Each information source in the list may have one or more topics or categories associated with it. If a particular category or topic is associated with an information source, this may indicate the information source is qualified to obtain data relating to the particular category or topic. In some aspects, selection of information sources may be based on meta-data associated with the electronic content 205 being searched. For example, each information source may have a priority associated with it. The selection of the information sources may be based on the priority. The priority may be effected by, for example, whether the information source is designated as a source for the category or topic as discussed above. In some aspects, the priority may also be effected by meta-data in the electronic content 205.

Thus, block 710 may select information sources by determining a subset of information sources in the list that are associated with the topic or category of block 705. In some aspects, the list of information sources may be configurable by an administrator. A priority of each of the information sources in the list may also be configurable by an administrator. For example, a user interface may be presented, the user interface configured to receive input defining the list of information sources and (optionally) their respective priorities. Configuring the list may include inputting information indicating a query format and Internet address for the information source. The list may be specific to one or more topics or categories. Thus, in some aspects the user interface is configured to associate a list for a group of one or more topics or categories. A separate list may be associated with a different group of one or more topics or categories. Thus, a plurality of lists may be supported for a plurality of topics/category groups.

In block 715, the selected information sources are searched for information relating to the assertion. As discussed above with respect to FIG. 6, in some aspects, an assertion may be represented by a tuple including a subject, object, and relation between the subject and object. Block 715 may search the selected information sources for the assertion. For example, if the assertion is "Microsoft Windows® version 8 is the most recent version," the assertion may be separated into the tuple with a subject "Microsoft Windows®, a relation of "most recent version" and a object of "version 8." Thus, in block 715, the selected information sources may be searched for "Microsoft Windows® most recent version." The results from the search may also be structured as tuples. Some of the results may include subjects and relations equivalent to the subject and relation of the first assertion. Thus, the search results may be filtered to include only those results with subjects and relations equivalent to t first assertion.

In block 720, the results of the search in block 715 are ranked. The ranking of the search results may be based on a variety of factors, depending on embodiment. For example, in some aspects, the ranking may consider one or more of a date associated with a particular search result, a priority of the information source providing the search result or a ranking assigned to the result by the information source (e.g. a ranking by Microsoft Bing® of a search result). In some aspects, search results may include answers provided on a user forum or social community. For example, a first user may post a question to the online forum or community. A response by a second user may include information relevant to the topic or assertion of block 705. Some aspects, may consider one or more characteristics of the response with respect to the forum when determining how to rank the search result. For example, one or more of a "correct answer" indication from the forum or community, a number of votes indicated by the community for the result, number of bookmarks of the result by the community, and whether a user posting the result is identified by the community as a trusted user may be used to determine a prioritization of a search result.

Block 725 determines a new assertion from the search results. In some aspects, the search results may be in text form or in the form of structured data such as XML. In these cases, the new assertion may be extracted from the search results using known text or structured document parsers. In some aspects, the search results may include images and/or video and/or audio data. In these aspects, a conversion to a text form may be performed first. For example, a speech to text algorithm may be run on search results in audio form. An optical character recognition process may be performed on any search results that includes images, such as snapshot single images or videos including multiple video (image) frames. For example, as described above, in some aspects, the results may be filtered down to a single result that provides the new assertion. The results may include information such as "Microsoft Windows 3.1 is a recent version," "The recently released Microsoft Windows 95 has several breakthrough improvements," and "What's new in Microsoft Windows version 10." These results may be ranked by, for example, a date associated with each individual result, and in some aspects, other criteria. In this hypothetical, the result stating "What's new in Microsoft Windows version 10" may be the most recent result. Thus, block 725 may determine a new assertion "Microsoft Windows version 10 is the most recent version" based on the assertion above and the results from block 720.

In block 730, a determination is made if the new assertion validates the first assertion. The determination is based on results meeting a criterion. In some aspects, search results meeting the criterion may include search results having a priority above a priority threshold. Validation of the first assertion may include verifying the first assertion. For example, if the first assertion indicates that the earth includes four billion people, and the search results indicate the earth includes nine billion people, the first assertion may be determined to be invalid. In contrast, if the first assertion indicates a current Microsoft Windows® version is version ten (10), and the search results indicate a variety of Microsoft Windows® version numbers, but version 10 is the highest version found, then the results validate the first assertion.

In some aspects, block 730 may utilize some of the techniques described above with respect to block 605. For example, in some aspects, entities may be identified in the new assertion, and a relation between the entities may also be established. The one or more entities and relationship(s) in the new assertion may be compared to one or more entities and relationship(s) identified in the first assertion to determine whether the first assertion is validated.

Figure 8:
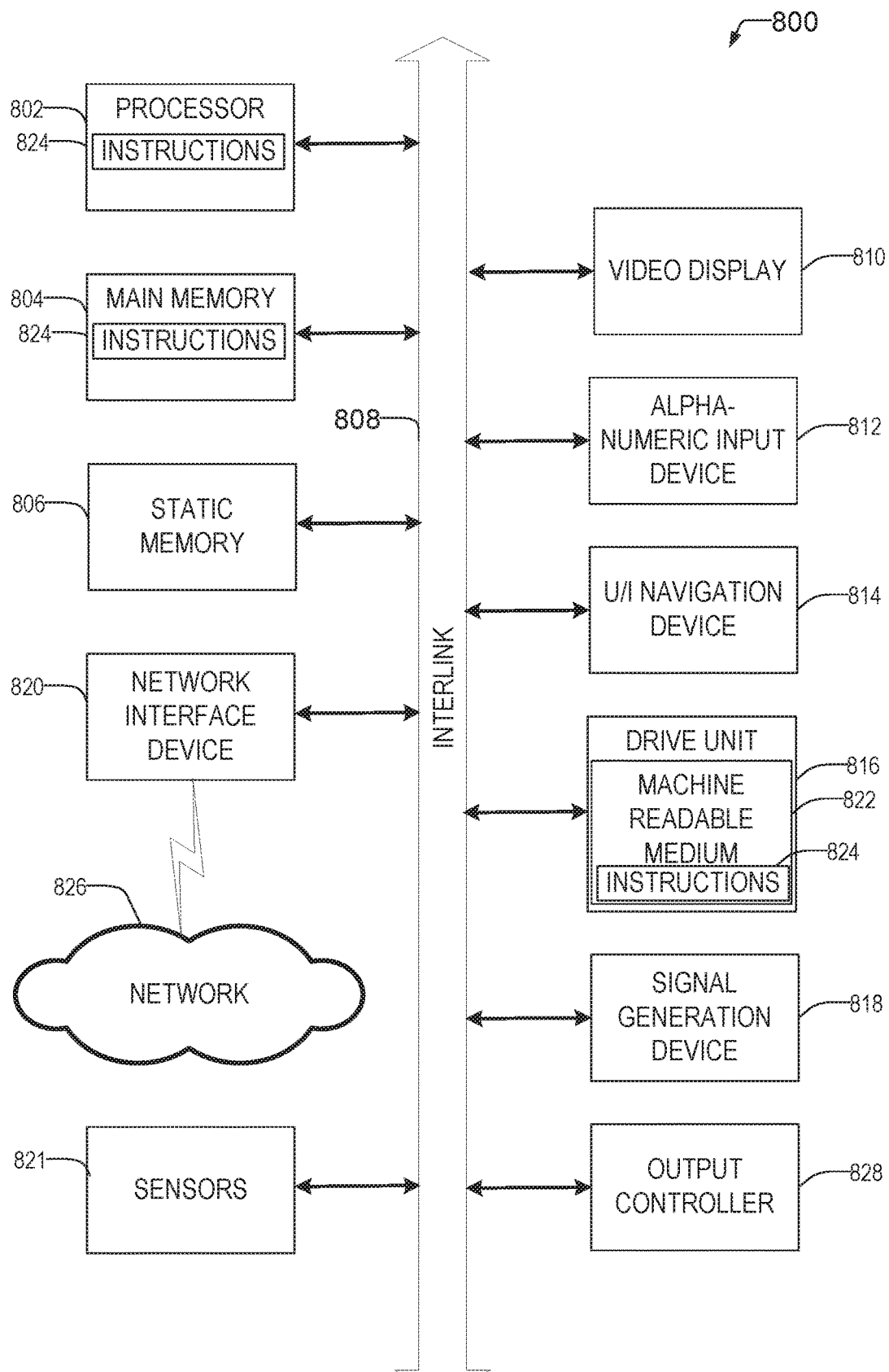
FIG. 8 illustrates a block diagram of an example machine 800 upon which any one or more of the techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. Machine 800 may implement, in whole or in part, the user devices 105, 110, electronic content accuracy engine 130, electronic content annotation engine 135, search engines 140A-B. In various embodiments, machine 800 may perform one or more of the processes described above with respect to FIGS. 5-7, or FIG. 9 below, and be configured with the components shown in FIG. 4 to implement one or more of the electronic content accuracy engine 130 and the electronic content annotation engine 135. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MLMO), or multiple-input single-output (MISO) techniques. In some examples, the network interface device 820 may wirelessly communicate using Multiple User MIMO techniques.

Figure 9:
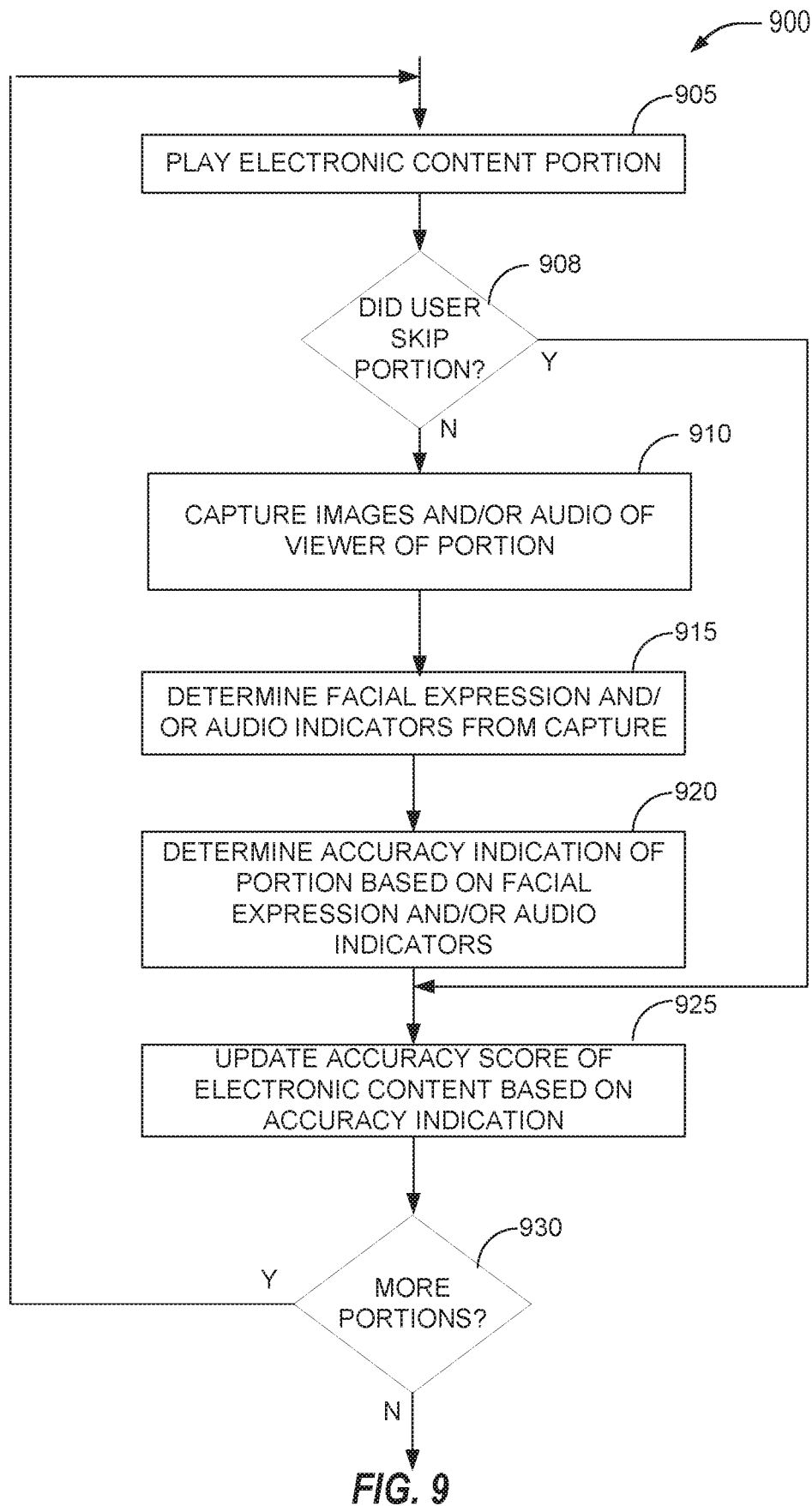
FIG. 9 is a flowchart of updating an accuracy score for media.

FIG. 9 is a flowchart of updating an accuracy score for electronic content. In some aspects, one or more of the functions discussed below with respect to FIG. 9 and process 900 may be performed by the processors 410 in some aspects, discussed above with respect to FIG. 4. For example, instructions stored in one or more of the electronic content engine 208, and accuracy scoring engine 270 may configure one or more hardware processors 410 to perform one or more of the functions of the example process 900 discussed below. In some aspects, process 900, discussed below, may be performed in conjunction with any one or more of processes 500, 550, and/or 630, discussed above.

In block 905, a portion of electronic content is played. In other words, some electronic content may facilitate a play function, that periodically generates output based on the electronic content. Examples of a play function are familiar, but may include playing a video, an audio recording, a Microsoft PowerPoint® slide presentation, or other play functions.

Decision block 908 determines if a user viewing the portion of electronic content skipped the portion. For example, block 908 may determine if input was received from the user indicating a fast forward operation or other input that would cause the portion not to be played. The input may request playback of a portion of the electronic content that is subsequent in a play sequence to the portion played in block 905. If the portion is skipped, process 900 moves to block 925, discussed in more detail below. Otherwise, process 900 moves from block 908 to block 910.

In block 910, one or more of image capture or audio capture is performed. The image capture and/or audio capture may capture reactions of a user as they view the playing of the electronic content portion of block 905.

In block 915, a facial expression of the user may be determined based on image capture. Alternatively, or additionally, a speech to text operation may be performed on audio capture in block 910. The text may represent words or expressions made by the user while viewing the electronic content portion.

In block 920, an accuracy indication of the electronic content portion is determined. If the portion was not skipped by the user in block 908, the accuracy indication may be determined in block 920 based on one or more of the facial expression and text presenting the words or expressions. If the user skipped the portion, the accuracy indication may reflect the assertion that the user did not find the portion relevant enough to continue viewing.

In block 925, the accuracy score of the electronic content is updated based on the determined accuracy indication of block 920. In some aspects, the accuracy indication may result in a reduced accuracy score for the electronic content. For example, in some aspects, a single user skipping the portion may result in a negative accuracy indication in block 920, but may not affect the accuracy score in block 925. Some implementations may apply one or more criteria to user actions or accuracy indications to determine how to update the accuracy score. For example, if a particular portion is skipped by more than a threshold number of users (resulting in a plurality of negative accuracy indications for the particular portion being received by block 925), the accuracy score for the electronic content may be degraded. A total number of views or playbacks of a portion may need to transgress a second threshold in some aspects before the accuracy score is affected by user actions. Some aspects may solicit feedback from the user as to the accuracy of the electronic content. Feedback from multiple users may be aggregated to determine how to update the accuracy score for the electronic content. In some aspects, repeated playback by one or more users may cause an increase in the accuracy score. In some aspects, block 925 may update the accuracy score determined in block 560 of FIG. 5, discussed above.

If the electronic content includes additional portions, process 900 returns to block 905. Otherwise, processing continues.

As previously described, the system may calculate one or more conversion ratios, correlation ratios, and the like based upon one or more machine learning algorithms.

Figure 10:
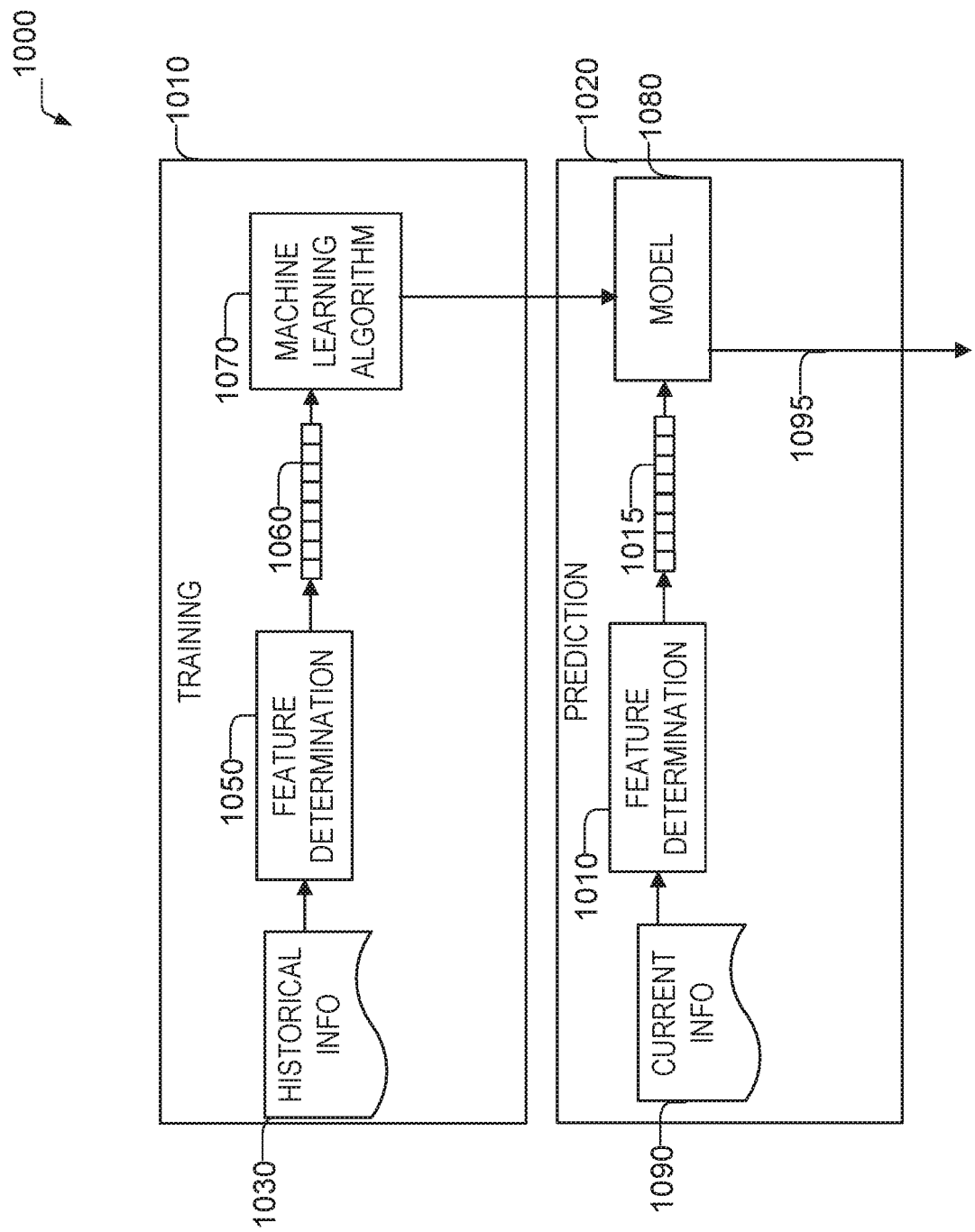
FIG. 10 shows an example machine learning module according to some examples of the present disclosure.

FIG. 10 shows an example machine learning module 1000 according to some examples of the present disclosure. Machine learning module 1000 utilizes a training module 1010 and a prediction module 1020. Training module 1010 inputs historical information 1030 into feature determination module 1050. The historical information 1030 may be labeled. Example historical information may include text or statements stored in a training library of text or statements. Labels may indicate portions of the text or statements that provide assertions.

Feature determination module 1050 determines one or more features 1060 from this historical information 1030. Stated generally, features 1060 are a set of the information input and is information determined to be predictive of a particular outcome. In some examples, the features 1060 may be all the historical activity data, but in other examples, the features 1060 may be a subset of the historical activity data. The machine learning algorithm 1070 produces a model 1080 based upon the features 1060 and the label.

In the prediction module 1020, current information 1090 may be input to the feature determination module 1010. Feature determination module 1010 may determine the same set of features or a different set of features from the current information 1090 as feature determination module 1050 determined from historical information 1030. In some examples, feature determination module 1010 and 1050 are the same module. Feature determination module 1010 produces feature vector 1015, which is input into the model 1080 to generate a likelihood of response score 1095. The training module 1010 may operate in an offline manner to train the model 1080. The prediction module 1020, however, may be designed to operate in an online manner. It should be noted that the model 1080 may be periodically updated via additional training and/or user feedback.

The machine learning algorithm 1070 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 1010. In an example embodiment, a regression model is used and the model 1080 is a vector of coefficients corresponding to a learned importance for each of the features in the vector of features 1060, 1015. To calculate a score, a dot product of the feature vector 1015 and the vector of coefficients of the model 1080 is taken.

Figure 11:
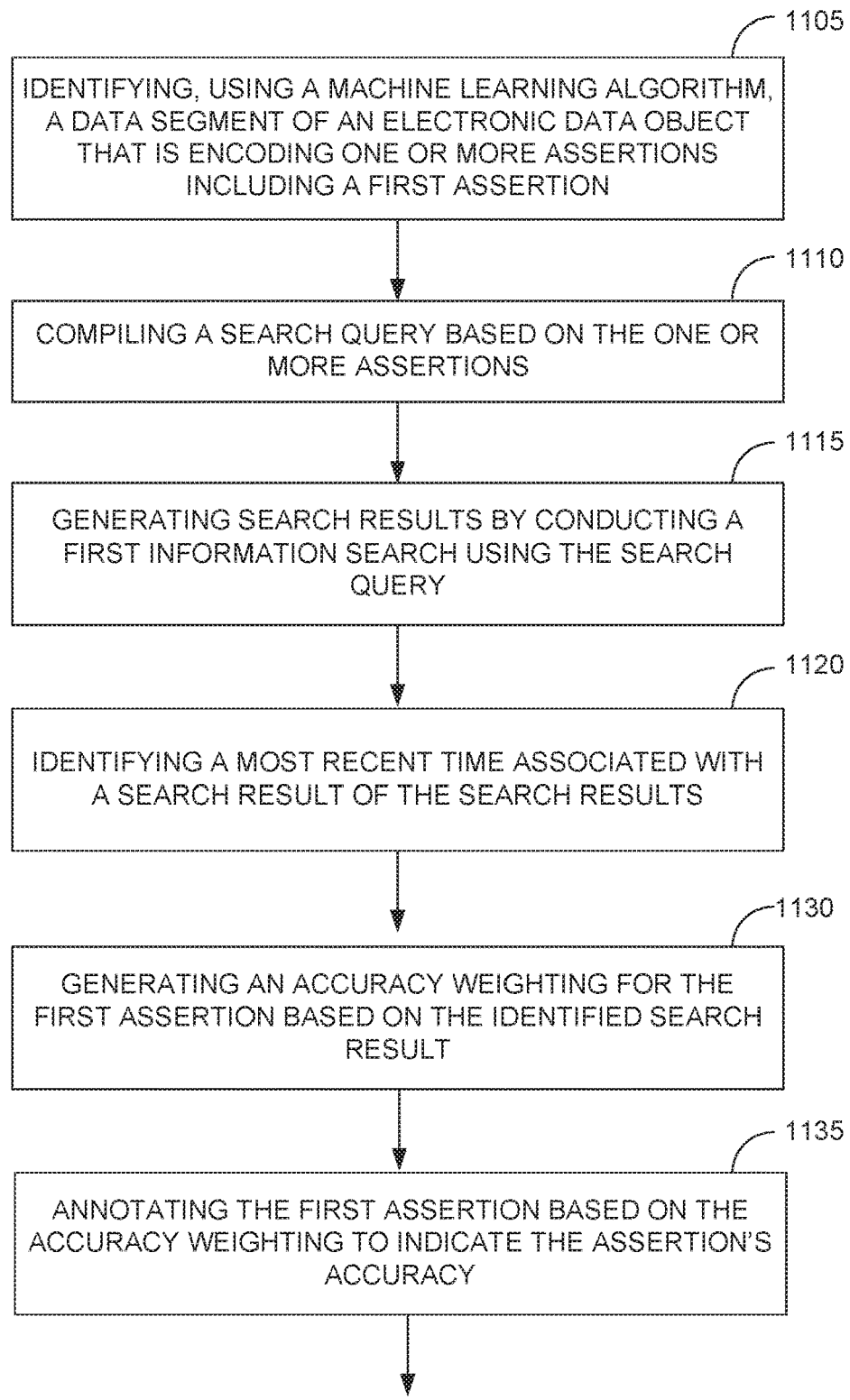
FIG. 11 is an example flowchart of a method for annotating an electronic data object.

FIG. 11 is a flowchart of an example method for annotating an electronic data object. FIG. 11 describes a process whereby an electronic data object, such as a file, may be scanned to determine its accuracy. In some aspects, the file may be a presentation file, a word processor file, a text file, a video, or any file that may encode human language. The language encoded in the electronic data object may be in one or more of text, image, binary, or audio form. As described below, process 1100 may extract this natural language from its various forms and identify assertions made by the natural language. The assertions may then be validated by a variety of information sources. In some aspects, the type of information source used to validate an assertion may depend on a general subject area to what the assertion pertains. Some of the information sources may be Internet search engines, while other information sources may be private for-fee databases.

After the assertions are either validated or invalidated by the searches, the results may be reflected in an accuracy weighting, which may be generated for individual assertions and, in some aspects, may be aggregated to form an accuracy assessment for the electronic data object itself. This accuracy assessment may be used for a variety of purposes. For example, the accuracy assessment for a file may be written, in some aspects, into file metadata. Some user interfaces may provide for display of the accuracy assessment as a column in a file explorer user interface for example. This may provide an ability to sort a set of files based on their determined accuracies, allowing users to quickly isolate the most accurate information.

In some aspects, one or more of the functions discussed below with respect to FIG. 11 and process 1100 may be performed by the processors 410 in some aspects, discussed above with respect to FIG. 4. For example, instructions stored in one or more of the electronic content engine 208, and accuracy scoring engine 270 may configure one or more hardware processors 410 to perform one or more of the functions of the example process 1100 discussed below. In some aspects, process 1100, discussed below, may be performed in conjunction with any one or more of processes 500, 550, and/or 630, discussed above.

In block 1105, a data segment of an electronic data object is identified that encodes one or more assertions. The assertions include at least a first assertion. In some aspects, block 1105 may include deriving text information from the data segment. In various aspects, the data segment may include audio data, image data, or text data. Block 1105 may use speech to text and/or optical character recognition technology to extract text from audio and/or video/image data respectively in various aspects. Once the text is obtained, the text may be fed to a natural language processor to identify the one or more assertions.

Some aspects may use open information extraction (OIE) to extract statements or assertions from the text obtained from the data segment. For example, in some aspects, the Open Information Extraction library that is included as part of the Stanford Core Natural Language Processing library, available from Stanford University, may be used. The assertions may be structured as tuples, with each tuple including a subject, an object, and a relation between the subject and the object. Thus, for example, is an assertion is made that Microsoft Windows 95 is the most recent version of the operating system, (Microsoft Windows, 95, most recent version) would be the tuple in some aspects.

Some aspects may use machine learning to identify the assertions. For example, in some aspects, a classifier may be trained using a set of training data. The training data may include text that includes an assertion and other text that does not include an assertion. The training of the classifier may enable the classifier to differentiate between statements that include assertions and those that do not, and by developing rules that separate the different types of text.

In block 1110, a search query is compiled based on the identified one or more assertions. In some aspects, the search query may include the subject and the relation from the tuple representing the assertion. In some aspects, the search query may not include the object. For example, if the tuple representing the assertion identified via OIE above is (Microsoft Windows, "latest version", Windows 95), the search query may be "Microsoft Windows" "latest version" without including the "Windows 95" object portion. Compiling the search query may include extracting the subject and relation from the tuple, and building a search query, using search query syntax, the subject, and the relation, to form the search query. For example, string concatenation operations may be used to form the search query based on the search query syntax, subject, and relation.

In block 1115, search results are generated by conducting an information search using the search query. Information sources for the query may be selected based on topics or categories. For example, the system 100 may maintain a list of information sources. For example, search engines 140a and 140b may be examples of information sources included in the list. Each information source in the list may have one or more topics or categories associated with it. If a particular category or topic is associated with an information source, this may indicate the information source is qualified to obtain data relating to the particular category or topic. In some aspects, selection of information sources may be based on meta-data associated with the electronic content 205 being searched. For example, each information source may have a priority associated with it. The selection of the information sources may be based on the priority. The priority may be effected by, for example, whether the information source is designated as a source for the category or topic as discussed above. In some aspects, the priority may also be effected by meta-data in the electronic content 205. Block 1115 may include at least sending the search query to a search engine and receiving search results from the search engine.

Thus, block 1115 may select information sources by determining a subset of information sources in the list that are associated with the topic or category of block 1115. In some aspects, the list of information sources may be configurable by an administrator. A priority of each of the information sources in the list may also be configurable by an administrator. For example, a user interface may be presented, the user interface configured to receive input defining the list of information sources and (optionally) their respective priorities. Configuring the list may include inputting information indicating a query format and Internet address for the information source. The list may be specific to one or more topics or categories. Thus, in some aspects the user interface is configured to associate a list for a group of one or more topics or categories. A separate list may be associated with a different group of one or more topics or categories. Thus, a plurality of lists may be supported for a plurality of topics/category groups.

Once the information sources are selected, the searches of e selected sources are performed to generate the search results.

In block 1120, a most recent time associated with the search results may be identified. For example, block 1120 may scan through the search results obtained in block 1115 to identify a result with a most recent time stamp. In some aspects, one or more of the functions discussed above with respect to process 630 may be included in block 1120. For example, one or more of blocks 720, 725, and 730 may be included in various aspects of block 1120.

In block 1130, an accuracy weighting for the first assertion is generated based on the identified search result. In some aspects, block 1130 will, using natural language processing, build a second tuple based on the search result. For example, block 1130 may build the tuple (Microsoft Windows, latest version, 10) from the search results. In other words, the search results may supply a new "object" for the tuple created in block 1110.

The first tuple identified in block 1110 may then be compared to the second tuple created in block 1130 to determine whether the assertion has been confirmed or contradicted by the search results. In other words, the two objects from the two tuples may be compared to determine if they agree, or if they are different. If they are different, the first assertion identified in block 1110 is contracted, and may no longer be valid. The accuracy weighting is then assigned to the first assertion based on this determination. For example, if the object in the second tuple confirms the object in the first tuple, the accuracy weighting may be assigned a relatively high value, whereas if the object in the second tuple is different than the object in the first tuple, the accuracy weighting may be assigned a lower relative value. In some aspects, one or more of the functions discussed above with respect to block 730 may be included in block 1130.

In block 1135, the first assertion is annotated in the electronic data object based on the accuracy weighting to indicate the assertions accuracy. For example, in some aspects, the annotation may take the form of one or more of at least meta data, audio data, or image data. If a particular portion of the electronic data object is determined to have a low accuracy (for example, an accuracy meeting a criteria), an image annotation indicating such may be inserted into the electronic data object. Alternatively, in some aspects, the image annotation may insert more accurate information into the electronic data object. The inserted annotation may be inserted so as to obscure the obsolete or inaccurate information. For example, obsolete or inaccurate information may be whited out or blacked out with a first annotation. A second annotation including more accurate information may then be inserted on top of the whited out or blacked out area for example. Alternatively, if the inaccurate information in the electronic data object is in audio form, an audio annotation may be inserted at a position within a limited proximity of the inaccurate audio information. For example, the inaccurate information may be "beeped" out with a first annotation, and a second annotation of accurate audio information may be inserted.

Process 1100 may operate iteratively in some embodiments. For example, if a plurality of assertions are identified in the electronic data object in block 1105, these assertions may be iteratively processed through blocks 1110, 1115, 1120, and 1130 as described above. The result may be individual accuracy weightings for each of identified assertions in the electronic data object.

Thus, some aspects may provide individual accuracy weightings for one or more assertions in an electronic data object. Some aspects may include additional accuracy weightings that aggregated at least some of these individual accuracy weightings to provide an accuracy weighting more reflective of an electronic data object, such as a file. In some aspects, the individual accuracy weightings may be averaged to determine an aggregated accuracy weighting for the electronic data object. In other aspects, the aggregated accuracy weighting may be a weighted average, with the weights of each individual accuracy score based on an amount of time the corresponding assertion is represented in the electronic data object. For example, if a first assertion is displayed for five (5) minutes and a second assertion is displayed for ten (10) minutes in a presentation file for example, the aggregated accuracy score may be determined by $$AAC = \sum_{i=1}^{n} WiAi/n \qquad (1)$$

Where:
  AAC is the aggregated accuracy score for an electronic data object such as a file.
  $W_i$ represents a proportional amount of time an assertion i is present when the electronic data object is viewed.
  $A_i$ is an accuracy weighting of assertion i.
  n is the number of assertions scored in the electronic data object.

In some aspects, annotating the electronic data object or the first assertion may include moving portions of the electronic data object to different locations within the electronic data object. For example, a portion of an electronic data object having an accuracy weighting below a threshold may be moved to an "end" or "back" of the electronic data object. The "end" or "back" may be a last portion of the electronic data object that is played during a "play" operation. For example, the last slide or slides of a presentation may be considered an "end" or "back" of the presentation. The new position of the obsolete portion(s) of the electronic data object may be later in a sequence of content when the electronic content is played.

Some embodiments of process 1100 may include causing display of a user interface. The user interface may include a list of a plurality of electronic data objects. Each electronic data object may have an associated accuracy weighting or score. In some aspects, a name of the electronic data object may be displayed in a first column of the user interface while an accuracy weighting or score of the named electronic data object may be displayed in a second column of the user interface. The columns may provide a sort capability, such that a user may select the accuracy column and sort the electronic data objects based on their accuracy weighting or score.

Some aspects of process 1100 may periodically delete electronic data objects with an accuracy weighting or score below a predetermined threshold. Alternatively, some aspects may generate a report of these objects with a relatively low accuracy weighting (below the predetermined threshold), and mail the report to a predetermined list of email addresses, which may be administered via a separate user interface.

OTHER NOTES AND EXAMPLES

Example 1 is a method of annotating an electronic data object to indicate the accuracy of said electronic data object, comprising: identifying a data segment of an electronic data object that is encoding one or more assertions including a first assertion; compiling a search query based on the one or more assertions; generating search results by conducting a first information search using the search query; identifying a most recent time associated with a search result of the search results that relates to the first assertion; generating an accuracy weighting for the first assertion based on search result; and annotating the first assertion based on the accuracy weighting to indicate the assertion's accuracy.

In Example 2, the subject matter of Example 1 optionally includes wherein identifying the data segment of the electronic data object that is encoding one or more assertions comprises generating a first tuple including a subject, relation, and object, the tuple representing the first assertion.

In Example 3, the subject matter of Example 2 optionally includes wherein compiling a search query comprises generating a query including the subject and the relation of the first tuple.

In Example 4, the subject matter of Example 3 optionally includes wherein generating an accuracy weighting for the first assertion comprises: generating a second tuple from the search result with the most recent associated time; comparing the object in the first tuple to an object in the second tuple; and generating the accuracy weighting based on the comparison.

In Example 5, the subject matter of any one or more of Examples 1-4 optionally include conveying an updated electronic data object including the first assertion in response to a request for the electronic data object.

In Example 6, the subject matter of any one or more of Examples 1-5 optionally include wherein annotating the first assertion comprises inserting information in the electronic data object including one or more of the audio data, image data, or text data, the inserted information indicating the accuracy weighting.

In Example 7, the subject matter of Example 6 optionally includes wherein the inserted information further indicates information derived from the search result with the most recent time.

In Example 8, the subject matter of any one or more of Examples 1-7 optionally include wherein annotating the first assertion comprises relocating a portion of the electronic data object with an accuracy weighting below a threshold from a first position in the electronic data object to a second position in the electronic data object, the second position subsequent in a viewing sequence of the electronic data object relative to the first position.

In Example 9, the subject matter of any one or more of Examples 1-8 optionally include causing display of a user interface including a representation of the electronic data object, the user interface configured to provide for a selection of the representation, the user interface further including a representation of the accuracy weighting.

In Example 10, the subject matter of Example 9 optionally includes wherein the user interface is further configured to sort a plurality of representations of electronic data objects based on a corresponding plurality of representations of accuracy weightings.

Example 11 is an apparatus for annotating an electronic data object to indicate the accuracy of the electronic data object, the apparatus comprising: one or more hardware processors, configured to: identify a data segment of an electronic data object that is encoding one or more assertions including a first assertion; compile a search query based on the one or more assertions; generating search results by conducting a first information search using the search query; identify a most recent time associated with a search result of the search results that relates to the first assertion; generate an accuracy weighting for the first assertion based on search result; and annotate the first assertion based on the accuracy weighting to indicate the assertion's accuracy.

In Example 12, the subject matter of Example 11 optionally includes wherein identifying the data segment of the electronic data object that is encoding one or more assertions comprises generating a first tuple including a subject, relation, and object, the tuple representing the first assertion.

In Example 13, the subject matter of Example 12 optionally includes wherein compiling a search query comprises generating a query including the subject and the relation of the first tuple.

In Example 14, the subject matter of Example 13 optionally includes wherein generating an accuracy weighting for the first assertion comprises: generating a second tuple from the search result with the most recent associated time; comparing the object in the first tuple to an object in the second tuple; and generating the accuracy weighting based on the comparison.

In Example 15, the subject matter of any one or more of Examples 11-14 optionally include wherein the one or more hardware processors are further configured to convey an updated electronic data object including the first assertion in response to a request for the electronic data object.

In Example 16, the subject matter of any one or more of Examples 11-15 optionally include wherein annotating the first assertion comprises inserting information in the electronic data object including one or more of the audio data, image data, or text data, the inserted information indicating the accuracy weighting.

In Example 17, the subject matter of Example 16 optionally includes wherein the inserted information further indicates information derived from the search result with the most recent time.

In Example 18, the subject matter of any one or more of Examples 11-17 optionally include wherein annotating the first assertion comprises relocating a portion of the electronic data object with an accuracy weighting below a threshold from a first position in the electronic data object to a second position in the electronic data object, the second position subsequent in a viewing sequence of the electronic data object relative to the first position.

In Example 19, the subject matter of any one or more of Examples 11-18 optionally include wherein the one or more hardware processors are further configured to cause display of a user interface including a representation of the electronic data object, the user interface configured to provide for a selection of the representation, the user interface further including a representation of the accuracy weighting.

In Example 20, the subject matter of Example 19 optionally includes wherein the user interface is further configured to sort a plurality of representations of electronic data objects based on a corresponding plurality of representations of accuracy weightings.

What is claimed is:

1. A method of annotating electronic data content with an accuracy indication of the electronic data content, the method comprising:
   identifying an assertion, having a subject and an object, in the electronic data content;
   compiling a search query based on the subject of the assertion;
   conducting a search based on the search query;
   obtaining a plurality of search results from the search;
   identifying a search result of the plurality of search results that includes information related to the object of the assertion;
   generating the accuracy indication for the assertion based on whether the information corroborates the assertion; and
   annotating the assertion based on the accuracy indication to provide an annotated assertion.

2. The method of claim 1, wherein the identifying of the data segment of assertion in the electronic data content comprises generating a first tuple including the subject, a relation, and the object, the first tuple representing the first assertion, and wherein the compiling of the search query comprises generating the search query including the subject and the relation of the first tuple.

3. The method of claim 2, wherein the generating of the accuracy indication for the assertion comprises:
   generating a second tuple, including a subject, a relation, and an object, from a selected search result of the plurality of search results, the selected search result having a most recent associated time of the plurality of search results;
   comparing the object in the first tuple to the object in the second tuple; and
   generating the accuracy indication based on the comparison.

4. The method of claim 1, further comprising conveying updated electronic data content including the annotated assertion in response to a request for the electronic data content.

5. The method of claim 1, wherein the annotating of the first assertion comprises inserting the accuracy indication in the electronic data content including one or more of audio data, image data, or text data, the inserted accuracy indication including an accuracy weighting, wherein the inserted accuracy indication further includes the information derived from a selected search result of the plurality of search results, the selected search result having a most recent associated time of the plurality of search results.

6. The method of claim 1, wherein the annotating of the first assertion comprises:
   comparing the accuracy indication to a threshold; and
   in response to the accuracy indication being less than the threshold, relocating the assertion from a first position in the electronic data content to a second position in the electronic data content, the second position being subsequent to the first position in a viewing sequence of the electronic data content.

7. The method of claim 1, further comprising causing display of a user interface including a representation of the electronic data content, the user interface configured to provide for a selection of the representation, the user interface further including a representation of the accuracy indication.

8. The method of claim 7, wherein the user interface is further configured to sort a respective plurality of representations of the plurality of search results based on a corresponding plurality of accuracy indications of respective assertions in the plurality of search results.

9. An apparatus for annotating electronic data content with an accuracy indication of the electronic data content, the apparatus comprising:
   one or more hardware processors, configured to:
   identify an assertion, having a subject and an object, in the electronic data content;
   compile a search query based on the subject of the assertion;
   conduct a search based on the search query;
   obtain a plurality of search results from the search;
   identify a search result of the plurality of search results that includes information related to the object of the assertion;
   generate the accuracy indication for the assertion based on whether the information corroborates the assertion; and
   annotate the assertion based on the accuracy indication to provide an annotated assertion.

10. The apparatus of claim 9, wherein the one or more hardware processors are further configured to to generate a first tuple including the subject, a relation, and the object, the first tuple representing the assertion.

11. The apparatus of claim 10, wherein the one or more hardware processors are configured to include the subject and the relation of the first tuple in the compiled search query.

12. The apparatus of claim 11, wherein the one or more hardware processors are configured to:
   generate a second tuple from a selected search result of the plurality of search results, the selected search result having a most recent associated time of the plurality of search results;
   compare the object in the first tuple to the object in the second tuple; and
   generate the accuracy indication based on the comparison.

13. The apparatus of claim 9, wherein the one or more hardware processors are further configured to convey updated electronic data content including the annotated assertion in response to a request for the electronic data content.

14. The apparatus of claim 9, wherein the one or more hardware processors are further configured to insert an accuracy weighting as the accuracy indication in the electronic data content including one or more of audio data, image data, or text data.

15. The apparatus of claim 14, wherein the inserted accuracy weighting further indicates information derived from a selected search result of the plurality of search results, the selected search result having a the most recent associated time of the plurality of search results.

16. The apparatus of claim 9, wherein the one or more hardware processors are further configured to:
   compare the accuracy indication to a threshold; and
   in response to the accuracy indication being less than the threshold, relocate the assertion from a first position in the electronic data content to a second position in the electronic data content, the second position being subsequent to the first position in a viewing sequence of the electronic data content.

17. The apparatus of claim 9, wherein the one or more hardware processors are further configured to cause display of a user interface including a representation of the electronic data content, the user interface configured to provide for a selection of the representation, the user interface further including a representation of the accuracy indication, wherein the user interface is further configured to sort a respective plurality of representations of the plurality of search results based on a corresponding plurality of accuracy indications of respective assertions in the plurality of search results.

18. An apparatus for annotating an electronic data content with an accuracy indication of the electronic data content, the apparatus comprising:
- means for identifying an assertion, having a subject and an object, in the electronic data content;
- means for compiling a search query based on the subject of the assertion;
- means for conducting a search based on the search query;
- means for obtaining a plurality of search results from the search;
- means for identifying a search result of the plurality of search results that includes information related to the object of the assertion;
- means for generating the accuracy indication for the assertion based on whether the information corroborates the assertion; and
- means for annotating the assertion based on the accuracy indication to provide an annotated assertion.

19. The apparatus of claim 18, wherein the means for identifying the assertion in the electronic data content includes means for generating a first tuple including the subject, a relation, and the object, the first tuple representing the assertion.

20. The apparatus of claim 19, wherein the means for generating the accuracy indication for the assertion comprises:
- means for generating a second tuple, including a subject, a relation, and an object, from a selected search result of the plurality of search results, the selected search result having a most recent associated time of the plurality of search results;
- means for comparing the object in the first tuple to the object in the second tuple; and
- means for generating the accuracy indication based on the comparison.

* * * * *